UNITED STATES PATENT OFFICE.

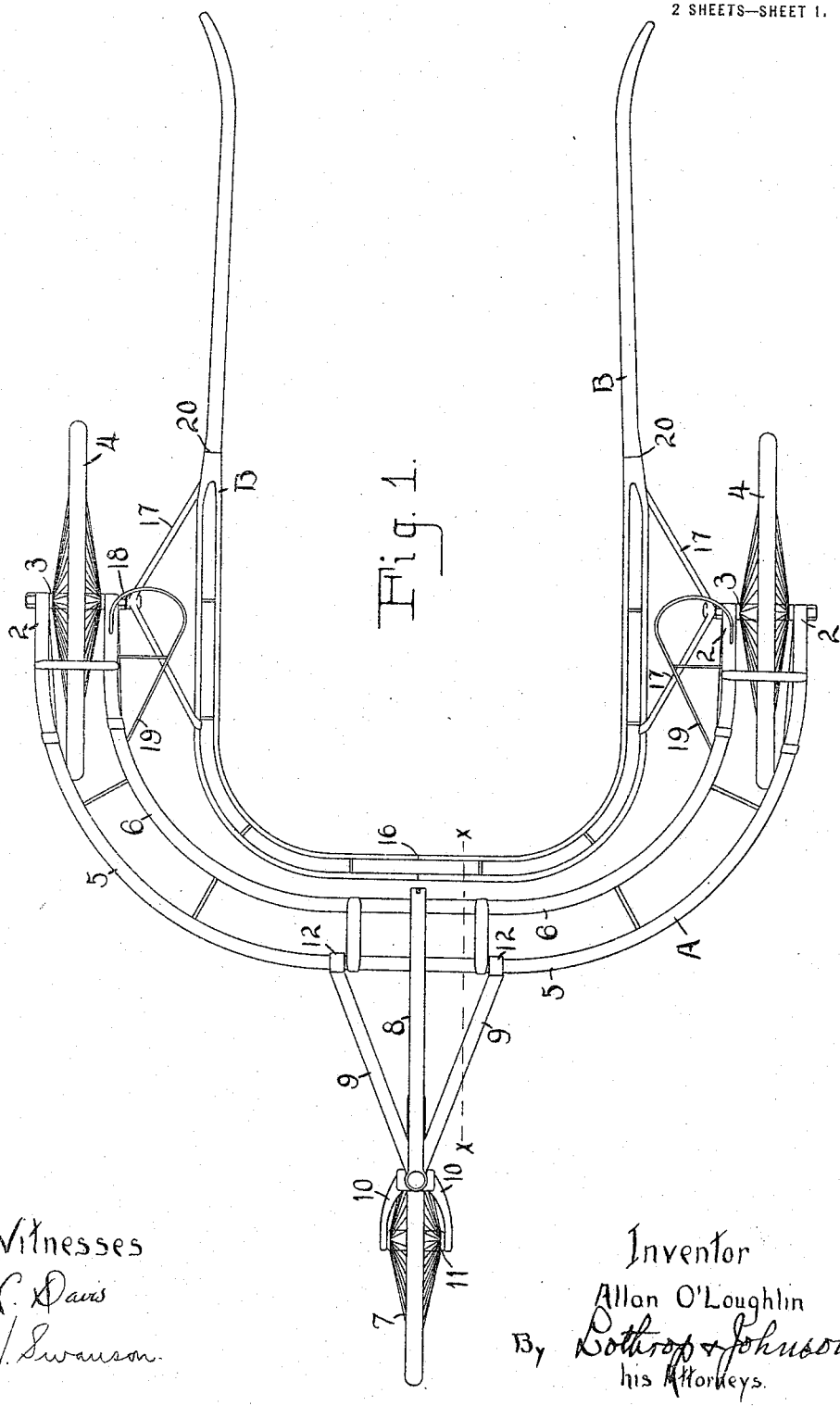

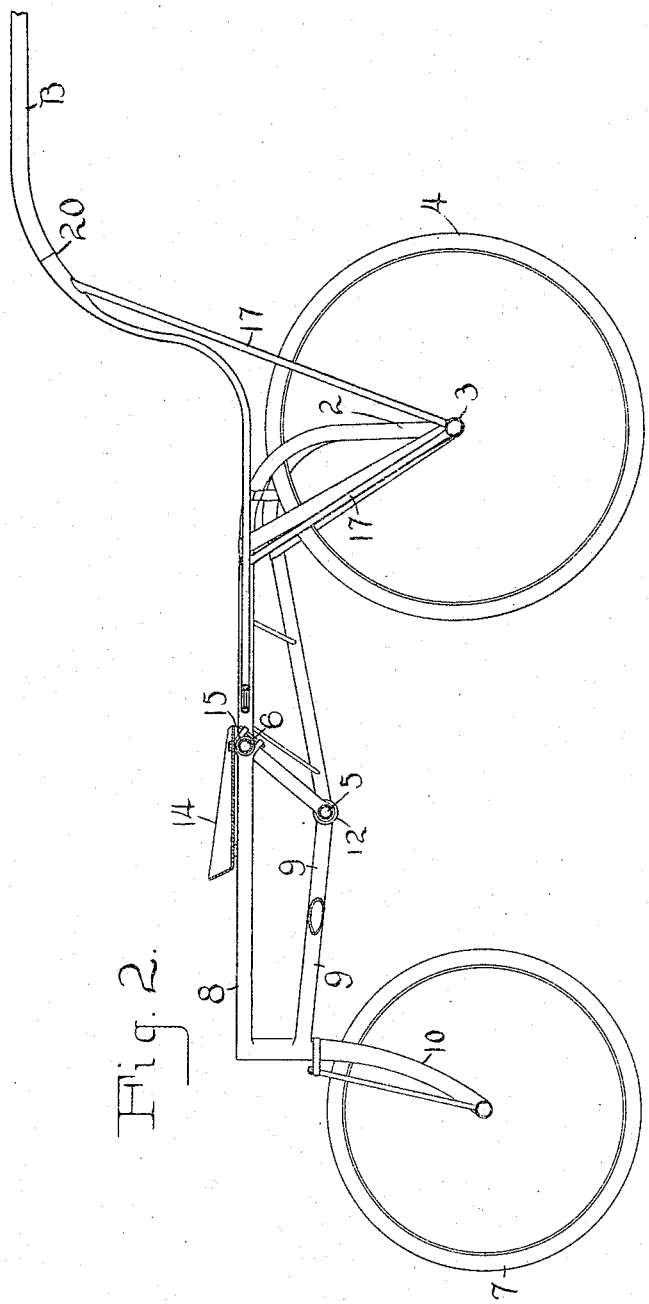

ALLAN O'LOUGHLIN, OF ST. PAUL, MINNESOTA, ASSIGNOR TO HELEN L. O'LOUGHLIN, OF ST. PAUL, MINNESOTA.

SULKY.

1,180,313.　　　Specification of Letters Patent.　　Patented Apr. 25, 1916.

Application filed July 14, 1914.　Serial No. 850,885.

*To all whom it may concern:*

Be it known that I, ALLAN O'LOUGHLIN, a subject of the King of Great Britain and Ireland, residing at St. Paul, in the county of Ramsey and State of Minnesota, have invented certain new and useful Improvements in Sulkies, of which the following is a specification.

My invention relates to improvements in racing sulkies, its object being to provide a construction of sulky by which the horse is relieved from the jar and pressure of the shaft caused by the weight of the driver and movement of the sulky.

A further object of the invention is to secure a construction of sulky which is particularly light and collapsible for the purpose of shipment.

To this end the invention consists in the construction, combination, and arrangement of parts hereinafter described and claimed.

In the accompanying drawings forming part of this specification, Figure 1 represents a plan view of a sulky embodying my features of invention; and Fig. 2 is a section on line $x$—$x$ of Fig. 1.

In carrying out my invention I provide a frame A preferably of tubing, the downwardly projecting front end 2 of the frame being formed with journal supports for the axles 3 of the side wheels 4. As shown, the frame consists of parallel bars 5 and 6 sufficiently spaced apart so that the ends 2 of the bars receive the ends of the axles 3, the bar 5 as shown standing centrally below the level of the bar 6.

Projecting rearwardly from the center of the frame A is a supporting frame for a third wheel 7 consisting of an upper bar 8 and lower bars 9 carried by a downwardly extending fork 10, said fork at its lower end constituting journal supports for the axle 11 of the wheel. The bars 9 at their front ends have swivel support 12 upon the bar 5 of the frame A. The bar 8 at its front end is adapted to be clamped to the bar 6 of the frame. A suitable seat 14 is supported on the frame as by having suitable support 15 upon the bar 6 and being preferably slidable with reference to said support. A pair of shafts B have connection 16 at their inner ends and are formed upon their sides with downwardly and outwardly projecting brackets 17. The brackets 17 as shown have pivotal support upon the inner ends of the wheel axles at 18. Stirrups 19 project inwardly from the sides of the frame A above the brackets 17, thus allowing the driver to secure a rest for his feet independent of and outside of the shafts. Each shaft is preferably separable at 20 so that the ends can be taken off for the purpose of packing.

For the purpose of shipment the seat 4 can be swung forwardly away from the supporting frame of the rear wheel and the clamp loosened to allow the supporting frame of the rear wheel to be swung underneath the frame A and into the space between the inner ends of the shafts. By having the shafts pivotally supported as shown upon the three wheel frame, and the driver's seat and stirrups carried by the frame independently of the shafts, I secure a construction in which none of the driver's weight comes on the horse and in which the horse is relieved from the jars and strains that are unavoidable with the ordinary construction of sulky. In the ordinary racing sulky the weight of the driver and the pressing of the feet against the stirrups carried by the shafts result in a strain upon the horse and the breaking of the horse's wind and other disadvantages, all of which are removed by my construction with its independently pivoted shafts, and I secure a much faster sulky than the ordinary type.

I claim as my invention:

1. In a sulky of the class described, the combination of a frame supported on three wheels, and a pair of shafts having pivotal support upon said frame inside the side wheels and at a point some distance in front of the rear ends of the shafts.

2. A sulky of the class described comprising a frame having forwardly projecting sides, a pair of wheels supported in the ends of said sides, a wheel centrally supported in the rear of said frame, and a pair of shafts pivotally supported upon said frame sides at a point some distance in front of the rear ends of the shafts.

3. A sulky of the class described comprising a frame including forwardly projecting sides, a pair of wheels supporting the ends of said sides, a wheel centrally supporting the rear of said frame, a pair of shafts connected at their rear ends, and a pivotal supporting connection between the sides of the shafts some distance in front of their connected rear ends and forwardly projecting sides of the frame.

4. A sulky of the class described comprising a frame including forwardly projecting sides, a pair of wheels supporting the ends of said sides, a wheel centrally supporting the rear of said frame, a pair of shafts connected at their rear ends, a pivotal supporting connection between the sides of the shaft some distance in front of their connected rear ends and the forwardly projecting sides of the frame, and stirrups secured upon the forwardly projecting sides of said frame alongside the sides of said shafts.

In testimony whereof I affix my signature in presence of two witnesses.

ALLAN O'LOUGHLIN.

Witnesses:
H. SWANSON,
AUTHUR P. LOTHROP.

Copies of this patent may be obtained for five cents each, by addressing the "Commissioner of Patents,
Washington, D. C."